(12) United States Patent
Zollinger et al.

(10) Patent No.: US 11,399,019 B2
(45) Date of Patent: Jul. 26, 2022

(54) FAILURE RECOVERY MECHANISM TO RE-ESTABLISH SECURED COMMUNICATIONS

(71) Applicant: NETFLIX, INC, Los Gatos, CA (US)

(72) Inventors: James Mitchell Zollinger, Los Gatos, CA (US); Wesley Miaw, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 337 days.

(21) Appl. No.: 14/920,661

(22) Filed: Oct. 22, 2015

(65) Prior Publication Data

US 2016/0119307 A1 Apr. 28, 2016

Related U.S. Application Data

(60) Provisional application No. 62/068,504, filed on Oct. 24, 2014.

(51) Int. Cl.
*H04L 29/06* (2006.01)
*H04L 9/40* (2022.01)
*H04L 9/32* (2006.01)

(52) U.S. Cl.
CPC ............ *H04L 63/08* (2013.01); *H04L 9/3228* (2013.01); *H04L 9/3247* (2013.01); *H04L 63/0823* (2013.01); *H04L 63/0846* (2013.01)

(58) Field of Classification Search
CPC ..... H04L 63/08; H04L 9/3247; H04L 9/3228; H04L 63/0823; H04L 63/0846
USPC .......................................................... 726/4
See application file for complete search history.

(56) References Cited

U.S. PATENT DOCUMENTS

| 6,223,287 | B1 | 4/2001 | Douglas et al. |
| 6,510,236 | B1 | 1/2003 | Crane et al. |
| 7,382,882 | B1* | 6/2008 | Immonen ............ H04L 63/0428 380/247 |
| 8,010,783 | B1 | 8/2011 | Cahill et al. |

(Continued)

FOREIGN PATENT DOCUMENTS

| CN | 101064695 A | 10/2007 |
| CN | 101278538 A | 10/2008 |

(Continued)

OTHER PUBLICATIONS

"ISO.8601", 1 page, Wikipedia, https://en.wikipedia.org/wiki/ISO.8601.

(Continued)

*Primary Examiner* — Dereena T Cattungal
(74) *Attorney, Agent, or Firm* — Artegis Law Group, LLP

(57) ABSTRACT

Embodiments of the present invention include techniques for reestablishing a secure communication channel between a client machine and a server machine. A client machine receives, from a server machine, a first message generated in connection with a first master token. The client machine detects an error condition associated with the first message. The client machine transmits, to the server machine, a second message generated in connection with a pre-provisioned key that includes a request for a new master token. The client machine receives, from the server machine, a third message that includes a second master token. The client machine transmits, to the server machine, a fourth message generated in connection with the second master token.

19 Claims, 9 Drawing Sheets

(56) References Cited

U.S. PATENT DOCUMENTS

| | | | |
|---|---|---|---|
| 8,868,923 B1 | 10/2014 | Hamlet et al. | |
| 8,880,896 B1 | 11/2014 | Elliott | |
| 8,943,311 B2* | 1/2015 | Ronda | H04L 63/0853 |
| | | | 713/156 |
| 8,966,599 B1 | 2/2015 | Barrows et al. | |
| 8,977,854 B2 | 3/2015 | Lee et al. | |
| 8,996,873 B1* | 3/2015 | Pahl | H04L 9/3013 |
| | | | 713/173 |
| 9,075,990 B1 | 7/2015 | Yang | |
| 9,215,232 B2* | 12/2015 | Fu | H04L 63/0823 |
| 9,537,899 B2* | 1/2017 | Cox | H04L 63/205 |
| 10,305,871 B2* | 5/2019 | Sullivan | H04L 63/061 |
| 2003/0204752 A1* | 10/2003 | Garrison | G06F 21/6227 |
| | | | 726/5 |
| 2004/0054898 A1 | 3/2004 | Chao et al. | |
| 2004/0103283 A1* | 5/2004 | Hornak | H04L 63/166 |
| | | | 713/175 |
| 2004/0215665 A1* | 10/2004 | Edgar | H04L 63/08 |
| 2005/0008158 A1* | 1/2005 | Huh | H04L 9/083 |
| | | | 380/256 |
| 2005/0216736 A1* | 9/2005 | Smith | H04L 63/0823 |
| | | | 713/168 |
| 2006/0193474 A1 | 8/2006 | Fransdonk | |
| 2006/0236096 A1* | 10/2006 | Pelton | H04L 63/06 |
| | | | 713/155 |
| 2007/0130463 A1* | 6/2007 | Law | G06F 21/34 |
| | | | 713/168 |
| 2007/0208936 A1 | 9/2007 | Ramos Robles | |
| 2008/0034216 A1* | 2/2008 | Law | H04L 9/3273 |
| | | | 713/183 |
| 2008/0165972 A1* | 7/2008 | Worthington | H04L 63/06 |
| | | | 380/278 |
| 2008/0212771 A1 | 9/2008 | Hauser | |
| 2009/0204808 A1 | 8/2009 | Guo et al. | |
| 2009/0217033 A1* | 8/2009 | Costa | H04L 63/08 |
| | | | 713/155 |
| 2009/0265554 A1 | 10/2009 | Robles et al. | |
| 2009/0327737 A1* | 12/2009 | Hsu | H04L 9/30 |
| | | | 713/181 |
| 2010/0153709 A1 | 6/2010 | Thomas et al. | |
| 2010/0228968 A1* | 9/2010 | Wason | H04L 9/3273 |
| | | | 713/156 |
| 2010/0257588 A1* | 10/2010 | Urien | H04L 63/166 |
| | | | 726/3 |
| 2011/0126001 A1 | 5/2011 | Fu et al. | |
| 2011/0126002 A1 | 5/2011 | Fu et al. | |
| 2011/0145900 A1 | 6/2011 | Chern | |
| 2011/0225641 A1* | 9/2011 | Wu | H04L 63/08 |
| | | | 726/9 |
| 2011/0305335 A1 | 12/2011 | Negishi et al. | |
| 2013/0067552 A1* | 3/2013 | Hawkes | H04L 63/166 |
| | | | 726/7 |
| 2013/0086381 A1 | 4/2013 | Thomas et al. | |
| 2013/0160086 A1* | 6/2013 | Katar | H04L 63/08 |
| | | | 726/4 |
| 2013/0212704 A1 | 8/2013 | Shablygin et al. | |
| 2013/0254519 A1* | 9/2013 | Benoit | G06F 11/3051 |
| | | | 713/1 |
| 2013/0268767 A1 | 10/2013 | Schrecker | |
| 2014/0003604 A1 | 1/2014 | Campagna et al. | |
| 2014/0019753 A1 | 1/2014 | Lowry et al. | |
| 2014/0040991 A1 | 2/2014 | Potonniee et al. | |
| 2014/0215215 A1* | 7/2014 | Tanaka | H04L 63/061 |
| | | | 713/171 |
| 2014/0237250 A1 | 8/2014 | Menezes et al. | |
| 2014/0281533 A1 | 9/2014 | de Andrade et al. | |
| 2014/0289826 A1* | 9/2014 | Croome | H04L 67/141 |
| | | | 726/5 |
| 2015/0007265 A1 | 1/2015 | Aissi et al. | |
| 2015/0019442 A1 | 1/2015 | Hird et al. | |
| 2015/0082392 A1 | 3/2015 | Gregg et al. | |
| 2015/0088758 A1 | 3/2015 | Varadarajan et al. | |
| 2015/0092233 A1 | 4/2015 | Park | |
| 2015/0095648 A1* | 4/2015 | Nix | H04W 4/70 |
| | | | 713/170 |
| 2015/0113275 A1 | 4/2015 | Kim et al. | |
| 2015/0222604 A1 | 8/2015 | Yionen | |
| 2015/0288514 A1* | 10/2015 | Pahl | H04L 9/085 |
| | | | 713/171 |
| 2015/0312038 A1 | 10/2015 | Palanisamy | |
| 2015/0350186 A1 | 12/2015 | Chan et al. | |
| 2016/0029215 A1 | 1/2016 | Jung et al. | |
| 2016/0050291 A1 | 2/2016 | Haug et al. | |
| 2016/0065370 A1 | 3/2016 | Le Saint et al. | |
| 2016/0105283 A1 | 4/2016 | Mityagin | |
| 2016/0127902 A1 | 5/2016 | Ciarniello et al. | |
| 2016/0300043 A1 | 10/2016 | Bi et al. | |
| 2016/0344725 A1* | 11/2016 | Severin | H04L 9/006 |
| 2017/0017957 A1 | 1/2017 | Radu | |
| 2017/0085381 A1 | 3/2017 | Richardson | |
| 2019/0097794 A1* | 3/2019 | Nix | H04L 9/0662 |
| 2021/0226813 A1 | 7/2021 | Sakamoto et al. | |

FOREIGN PATENT DOCUMENTS

| | | |
|---|---|---|
| CN | 101674304 A | 3/2010 |
| CN | 102098157 A | 6/2011 |
| CN | 103491084 A | 1/2014 |

OTHER PUBLICATIONS

"JSON Schema" 2 pages, http://json-schema.org/.

International Search Report and Written Opinion for International Application No. PCT/US2015/057213 dated Feb. 1, 2016, 13 pages.

International Search Report and Written Opinion for International Application No. PCT/US2015/057220 dated Feb. 2, 2016, 13 pages.

International Search Report and Written Opinion for International Application No. PCT/US2015/057224 dated Jun. 13, 2016, 13 pages.

Ganesan, R., "Yaksha: augmenting Kerberos with public key cryptography", Network and Distributed System Security, 1995, Proceedings of the Symposium on San Diego, CA, Feb. 16-17, 1995, Los Alamitos, CA, IEEE Comput. Soc, Feb. 16, 1995, pp. 132-143, XP010134533.

Wang et al., "Joint data aggregation and encryption using Slepian-Wolf coding for clustered wireless sensor networks", Wireless Communications and Mobile Computing, Jan. 1, 2009, pp. 573-583, XP55277264.

Molva et al., "KryptoKnight authentication and key distribution system", Nov. 23, 1992, Correct System Design; [Lecture Notes in Computer Science; Lecture Notes Computer], Springer International Publishing, Cham, pp. 155-174, XP047003809.

Final Office Action for U.S. Appl. No. 14/920,641 dated Aug. 3, 2017.

Non-Final Office Action for U.S. Appl. No. 14/920,657, dated Jul. 18, 2019, 21 pages.

Final Office Action for U.S. Appl. No. 14/920,657, dated Dec. 19, 2019, 22 pages.

Non-Final Office Action received for U.S. Appl. No. 14/920,657, dated Apr. 6, 2020, 23 pages.

Final Office Action received for U.S. Appl. No. 14/920,657, dated Aug. 19, 2020, 29 pages.

Non-Final Office Action received for U.S. Appl. No. 14/920,657, dated Jan. 13, 2021, 27 pages.

Non Final Office Action received for U.S. Appl. No. 14/920,641 dated Apr. 6, 2017, 17 pages.

Notice of Allowance received for U.S. Appl. No. 14/920,641 dated Jan. 10, 2018, 8 pages.

Notice of Allowance received for U.S. Appl. No. 14/920,641 dated Apr. 6, 2018, 13 pages.

Non Final Office Action received for U.S. Appl. No. 14/920,657 dated Jul. 27, 2018, 24 pages.

Final Office Action received for U.S. Appl. No. 14/920,657 dated Feb. 7, 2019, 19 pages.

Final Office Action received for U.S. Appl. No. 14/920,657 dated May 25, 2021, 32 pages.

(56) References Cited

OTHER PUBLICATIONS

Non Final Office Action received for U.S. Appl. No. 14/920,657 dated Nov. 12, 2021, 25 pages.
Restriction Requirement received for U.S. Appl. No. 14/920,657 dated Feb. 12, 2018, 10 pages.
Final Office Action received for U.S. Appl. No. 14/920,657 dated Mar. 17, 2022, 37 pages.

\* cited by examiner

FAILURE RECOVERY MECHANISM TO RE-ESTABLISH SECURED COMMUNICATIONS

CROSS-REFERENCE TO RELATED APPLICATIONS

This application claims the benefit of the United States provisional patent application titled, "MESSAGE SECURITY LAYER FOR COMMUNICATIONS OVER A NETWORK," filed on Oct. 24, 2014 and having Ser. No. 62/068,504. The subject matter of this related application is hereby incorporated herein by reference.

BACKGROUND OF THE INVENTION

Field of the Invention

Embodiments of the present invention relate generally to computer security and, more particularly, to a failure recovery mechanism to re-establish secured communications.

Description of the Related Art

Machines within a computer network typically employ various techniques to exchange secure messages when those machines communicate with one another in an effort to prevent third-parties from reading or tampering with the exchanged messages and potentially engaging in illegal or undesirable activities such as identity theft, corporate espionage, or stealing or compromising services. Conventional techniques to secure computer communications usually include mechanisms that ensure that a given received message was transmitted and received by appropriate machines within the computer network and that the content associated with a given received message was not tampered with or marginalized after being transmitted by an appropriate machine within the computer network.

Exemplary approaches for exchanging secure messages include Transport Layer Security (TLS) and predecessor Secure Sockets Layer (SSL). TSL and SSL are cryptographic protocols designed to provide communications security over a computer network for various purposes, including web browsing, email, Internet faxing, instant messaging, and voice-over-IP (VoIP). In general, TLS and SSL can be used to secure all communications between server machines offering various online services and client machines that access such online services. The TLS and SSL protocols provide privacy and data integrity during message exchange between two or more communicating computer applications executing on two or more different machines.

One such technique involves encrypting messages prior to transmitting those messages from one machine within the computer network to another machine. In a typical implementation, a machine that wishes to receive secure messages, referred to herein as a receiving machine, transmits a security "certificate" to other machines within the computer network. The security certificate includes information setting forth the manner in which a message needs to be encrypted in order for the receiving machine to be able to decrypt the message. Typically, the security certificate is issued by a trusted authorized agency on behalf of the receiving machine.

In some cases, the security certificate may be subject to tampering by malicious and unauthorized third-parties. A machine that receives and utilizes a compromised security certificate may unwittingly encrypt messages that are then readable by an unauthorized third-party rather than the intended machine. In order to reduce the likelihood of utilizing a security certificate that has been tampered with, the contents of a security certificate may be tested for data indicating that the certificate was issued by one of a small number of authorized agencies. If the test passes, then the certificate was likely issued by an authorized agency, also known as a certification authority, and the certificate can be used to safely encrypt messages. If the test fails, then the security certificate was not issued by an authorized agency and should not be used to encrypt messages. These security certificates typically include an expiration date. After the expiration date, messages encrypted via the expired certificate are no longer accepted by the receiving machine. Consequently, in order to continue functioning securely, the receiving machine updates the security certificate on or before the expiration date. This updated security certificate includes a new expiration date along with updated information regarding how to encrypt messages for the receiving machine.

If the receiving machine cannot decrypt a particular incoming message, then the receiving machine indicates a security error condition and communication ceases between the receiving machine and the machine that transmitted the improper message. Typically, a message is improper either because the message has been corrupted or because the message was encrypted using information from an expired or compromised security certificate.

One drawback to the above approach is that once a security error condition is indicated, communications cannot resume between the two machines without some form of manual intervention. Typically, a system administrator is needed to find and repair the condition that caused the security error condition or to install an updated security certificate. Until the system administrator finds and repairs the underlying problem, the machines are disabled from securely communicating with each other, leading to a loss of service.

As the foregoing illustrates, what is needed in the art is a more effective and robust way to establish secure message transmissions between two machines in a computer network.

SUMMARY OF THE INVENTION

One embodiment of the present invention sets forth a method. The method includes receiving, from a server machine, a first message generated in connection with a first master token. The method further includes detecting an error condition associated with the first message. The method further includes transmitting, to the server machine, a second message generated in connection with a pre-provisioned key that includes a request for a new master token. The method further includes receiving, from the server machine, a third message that includes a second master token. The method further includes transmitting, to the server machine, a fourth message generated in connection with the second master token.

Other embodiments of the present invention include, without limitation, a computer-readable medium including instructions for performing one or more aspects of the disclosed techniques as well as a client machine, server machine, or other computing device for performing one or more aspects of the disclosed techniques.

At least one advantage of the disclosed approach is that, after a security error condition is encountered during a message exchange between machines, those machines can automatically reestablish secure communications via a secure failure recovery technique using pre-provisioned keys. As a result, secure communications between the machines can be restored without manual intervention, in contrast with prior art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Techniques are described herein for authenticating and encrypting messages exchanged between client machines and server machines. The techniques are referred to herein as "message security layer" (MSL). In particular, if a server machine detects an error condition associated with a received message, the server machine may enter a failure recovery cryptographic mode, where the client machine and the server machine exchange one or more messages using pre-provisioned keys, not associated with the current set of session keys, including, without limitation, a public/private key scheme for server authentication and/or message encryption. In some embodiments, the server machine may transmit key exchange data as part of the first message transmitted to the client machine after detecting an error condition. In other embodiments, the server machine may transmit key exchange data in a subsequent message transmitted to the client machine. From this failure recovery mode, the server machine may reestablish a secure communication channel with the client machine and exchange new session keys and master tokens. An overview of the system is next described, followed by a more detailed description of the failure recovery mechanism.

System Overview

Figure 1:
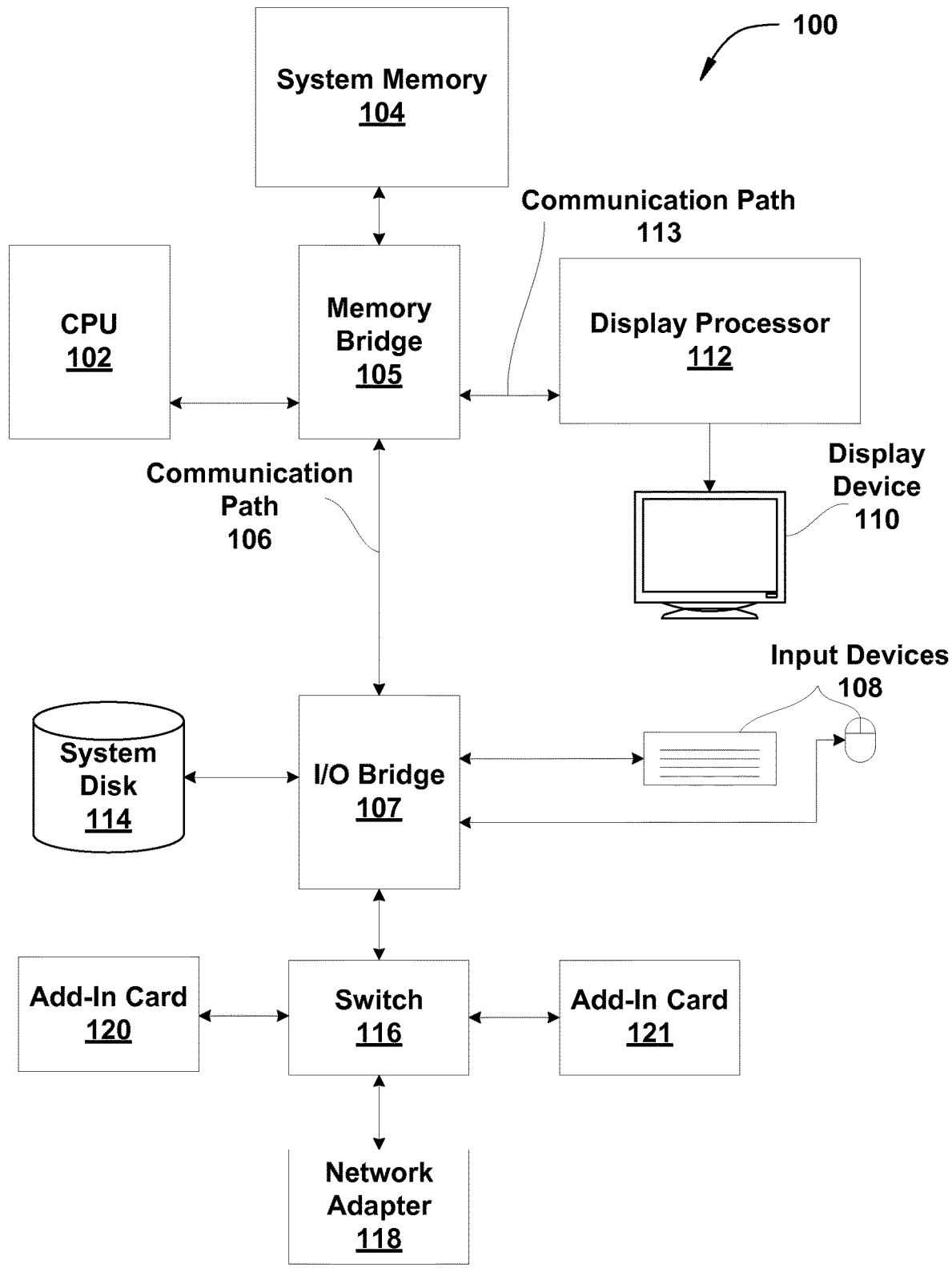
FIG. 1 is a block diagram illustrating a machine configured to implement one or more aspects of the present invention.

FIG. 1 is a block diagram illustrating a machine 100 configured to implement one or more aspects of the present invention. Machine 100 may be a personal computer, video game console, personal digital assistant, mobile phone, mobile device or any other device suitable for practicing one or more embodiments of the present invention.

As shown, machine 100 includes, without limitation, a central processing unit (CPU) 102 and a system memory 104 communicating via a bus path that may include a memory bridge 105. CPU 102 includes one or more processing cores, and, in operation, CPU 102 is the master processor of machine 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows machine 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server machines, each similar to machine 100, via network adapter 118 or system disk 114. The render farm generates one or more rendered images of the scene using the provided instructions and/or data. These rendered images may be stored on computer-readable media in a digital format and optionally returned to machine 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including any rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Client/Server Communications Over the Network

Figure 2:
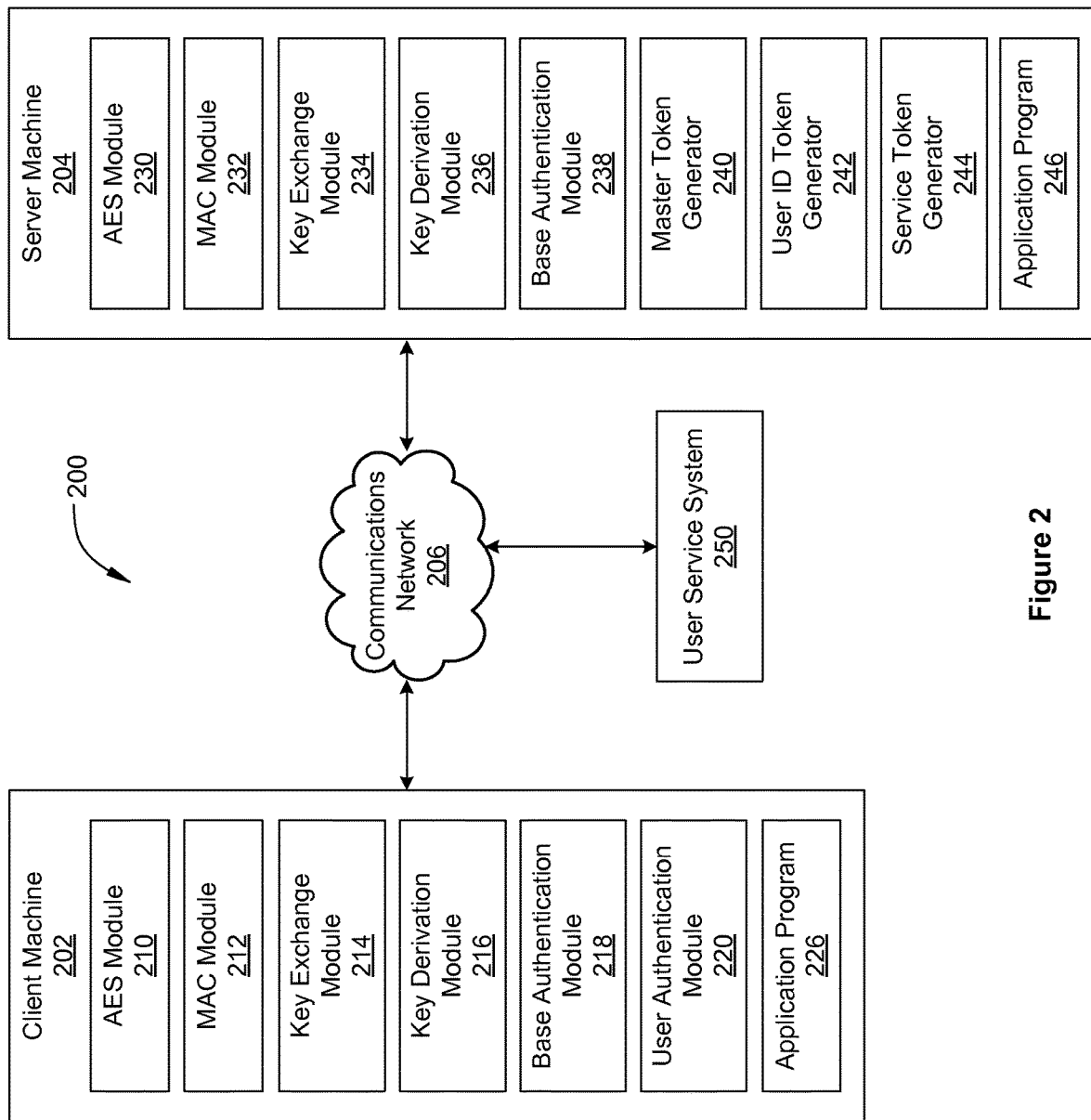
FIG. 2 illustrates a computer network configured to implement one or more aspects of the present invention.

FIG. 2 illustrates a computer network 200 configured to implement one or more aspects of the present invention. As shown, the computer network 200 includes, without limitation, a client machine 202, a server machine 204, and a user service system 250 connected to each other via a communications network 206. The communications network 206 may be any suitable environment to enable communications among remotely located machines, including, without limitation, a LAN (Local Area Network) and a WAN (Wide Area Network).

The client machine 202 is configured to exchange data with a server machine 204. In some embodiments, the client machine 202 and the server machine 204 may also communicate with one or more user service system 250s, such as user service system 250. The client machine 202 is configured to transmit messages to the server machine 204. The server machine 204 is likewise configured to transmit messages to the client machine 202. The messages exchanged between the client machine 202 and the server machine 204 include one or more of message data, authentication information, authorization information, tokens, key exchange data, authenticated data and encrypted data. In some embodiments, the client machine 202 and the server machine 204 may communicate with the user service system 250 for the purpose of user authentication, as further described herein.

The client machine 202 includes an AES module 210, a MAC module 212, a key exchange module 214, a key derivation module 216, a base authentication module 218, a user authentication module 220, and an application program 226. The server machine 204 includes an AES module 230, a MAC module 232, a key exchange module 234, a key derivation module 236, a base authentication module 238, a master token generator 240, a user ID token generator 242, a service token generator 244, and an application program 246. The functions of these various modules and token generators are now described in further detail.

The Advanced Encryption Standard (AES) modules 210 and 230 perform symmetric key cryptography on data transmitted between the client machine 202 and the server machine 204. The AES module 210 in the client machine 202 encrypts data for transmission from the client machine 202 to the server machine 204, and decrypts data received by the client machine 202 from the server machine 204. Likewise, the AES module 230 in the server machine 204 encrypts data for transmission from the server machine 204 to the client machine 202, and decrypts data received by the server machine 204 from the client machine 202.

The AES modules 210 and 230 perform two operations. The first operation encrypts plaintext into ciphertext according to equation (1) below:

$$\text{ciphertext}=\text{encrypt}(\text{plaintext},\text{aes\_key},\text{mode},\text{initialization\_vector}) \qquad (1)$$

where plaintext is the unencrypted text prior to encryption, aes_key and initialization_vector are parameters employed by the AES units 210 or 230 to encrypt the text according to the Advanced Encryption Standard, and ciphertext is the resulting encrypted text. In some embodiments, an initialization vector is not needed for certain cipher modes of the algorithm. Mode is a configuration parameter for encryption and decryption operations, where mode includes, without limitation, electronic code book (ECB) mode, cipher-block chaining (CBC) mode, and counter mode.

The second operation decrypts plaintext from ciphertext according to equation (2) below:

$$\text{plaintext}=\text{decrypt}(\text{ciphertext},\text{aes\_key},\text{mode},\text{initialization\_vector}) \qquad (2)$$

where ciphertext is the encrypted text prior to decryption, aes_key and initialization_vector are parameters employed by the AES modules 210 and 230 to decrypt the text according to the Advanced Encryption Standard, and plaintext is the resulting decrypted text. In some embodiments, an initialization vector is not needed for certain cipher modes of the algorithm. Mode is a configuration parameter for encryption and decryption operations, where mode includes, without limitation, ECB mode, CBC mode, and counter mode.

In various embodiments, the AES modules 210 and 230 may be implemented in software, hardware, or any combination of hardware or software. In particular, the AES modules 210 and 230 may be implemented in a hardware security module (HSM) or inside a trusted execution environment (TEE) for security purposes. In some embodiments, symmetric key crypto algorithms other than AES may be used. In such cases, the AES modules 210 and 230 may be replaced by an module that performs an alternative symmetric key crypto algorithms, including, without limitation, Blowfish, Twofish, and TripleDES. In various embodiments, the AES modules 210 and 230 may be stateless or stateful, depending at least on the mode.

The Message Authentication Code (MAC) modules 212 and 232 perform authentication and integrity protection associated with data transmitted between the client machine 202 and the server machine 204. The MAC module 212 in the client machine 202 generates a MAC corresponding to data for transmission from the client machine 202 to the server machine 204, and verifies a received MAC against the corresponding data received by the client machine 202 from the server machine 204. Likewise, the MAC module 232 in the server machine 204 generates a MAC corresponding to data for transmission from the server machine 204 to the client machine 202, and verifies a received MAC against the corresponding data received by the server machine 204 from the client machine 202.

In various embodiments, the MAC modules 212 and 232 may employ any technically feasible message authentication code technique, including, without limitation, keyed-hash MAC (HMAC), parallelizable MAC (PMAC), or universal hashing MAC (UMAC). By way of example only, the MAC modules 212 and 232 described herein employ HMAC.

The MAC modules 212 and 232 perform two operations. The first operation generates a MAC corresponding to particular data according to equation (3) below:

$$\text{mac}=\text{generate}(\text{data},\text{mac\_key},[\text{hash\_algorithm}]) \qquad (3)$$

where data is the input data for which the MAC is generated, mac_key is a parameter employed by the MAC modules 212 and 232 to generate the MAC according to the selected MAC standard, and mac is the generated MAC. Typically, a generated MAC is transmitted along with the corresponding data. hash_algorithm is a parameter needed by some MAC algorithms that specifies a particular hash algorithm. For example, if the MAC module employs HMAC, the value of hash_algorithm could include, without limitation, SHA-1, SHA-256, or SHA-3. If the MAC module employs PMAC or UMAC, the hash_algorithm could be omitted.

The second operation verifies whether a given set of data generates a corresponding MAC according to equation (4) below:

$$\{T|F\}=\text{verify}(\text{data},\text{mac},[\text{hash algorithm}]) \qquad (4)$$

where data is the data being authenticated and verified for integrity, mac is the corresponding MAC, and $\{T|F\}$ is a Boolean value that is true if the MAC modules 212 or 232 successfully verifies the MAC against the data, and false otherwise. As described above, hash_algorithm is a parameter needed by some MAC algorithms that specifies a particular hash algorithm.

In various embodiments, the MAC modules 212 and 232 may be implemented in software, hardware, or any combination of hardware or software. In particular, the MAC modules 212 and 232 may be implemented in an HSM or TEE for security purposes. The MAC modules 212 and 232 may be stateless.

The key exchange modules 214 and 234 are used to exchange keys between client machine 202 and server machine 204. In various embodiments, the key exchange modules 214 and 234 may employ any technically feasible key exchange technique, including, without limitation, Diffie-Hellman or cryptographic key wrapping methods. By way of example only, the key exchange modules 214 and 234 described herein employ Diffie-Hellman key exchange.

In the Diffie-Hellman embodiment, the key exchange module 214 in the client machine 202 generates a public value 'A' to transmit to the server machine 204, and computes a shared secret value from a private value 'a' retained by the client machine 202 and a public value 'B' received from the server machine 204. Likewise, the key exchange module 234 in the server machine 204 generates a public value 'B' to transmit to the client machine 202, and computes the shared secret value from a private value 'b' retained by the server machine 204 and the public value 'A' received from the client machine 202.

The Diffie-Hellman embodiment of the key exchange modules 214 and 234 perform two operations. The first operation calculates the public values A and B from the private values a and b according to equations (5) and (6) below:

$$\text{Client public key: } A=\text{generate}(g,p)=g^a \bmod p \qquad (5)$$

$$\text{Server public key: } B=\text{generate}(g,p)=g^b \bmod p \qquad (6)$$

where A is the client machine 202 public value, a is the client machine 202 private value, B is the server machine 204 public value, b is the server machine 204 private value, and g (generator value) and p (prime value) are additional parameters for generating the keys.

After calculating the public keys, the key exchange module 214 transmits the public value 'A' for the client machine 202 to the server machine 204. The key exchange module 234 transmits the public value 'B' for the server machine 204 to the client machine 202. In one embodiment, the key exchange module 214 may additionally transmit the 'g' and 'p' values to the server machine 204. In another embodiment, the key exchange modules 214 and 234 may have previously shared, or otherwise agreed upon, the 'g' and 'p' values.

The second operation of the Diffie-Hellman embodiment is calculating the shared secret (ss) value according to equations (7) and (8) below:

$$\text{Client shared secret: ss=calculate}(B)=g^{ab} \bmod p = B^a \bmod p \quad (7)$$

$$\text{Server shared secret: ss=calculate}(A)=g^{ab} \bmod p = A^b \bmod p \quad (8)$$

The client machine 202 and the server machine 204 generate the same value for the shared secret. The client machine 202 generates the value of the shared secret based on 'g', 'p', the client machine 202 private value 'a', and the server machine 204 public value 'B'. Likewise, the server machine 204 generates the same value of the shared secret based on 'g', 'p', the server machine 204 private value 'b', and the client machine 202 public value 'A'.

Typically, the key exchange module 214 on the client machine 202 is stateful and the key exchange module 234 on the server machine 204 is stateless. However, in some embodiments, the key exchange module 234 may be stateful. In particular, key exchange module 214 stores 'a' as state at least until the corresponding B value is returned by the server machine 204. The key exchange module 234 calculates the 'b' value, but does not need to maintain 'b' as state. Rather, the key exchange module 234 typically discards 'b' after the server machine 204 calculates the shared secret value and transmits the B key to the client machine 202.

The key derivation modules 216 and 236 compute the session keys from the shared secret value computed by the key exchange modules 214 and 234. Each set of session keys includes two keys, namely, the HMAC key and the AES key, discussed above. The session keys are employed by various entities engaging in secure communications for the purpose of encrypting and authenticating messages. Each message created by an entity using the MSL protocol may include both authentication/integrity protection, provided by the generated HMAC using the HMAC key, and data encryption, provided by the AES key. The HMAC key provides authentication and integrity protection for exchanged messages, while the AES key provides privacy by encrypting the data in the message. The key derivation modules 216 and 236 compute the session keys according to equation (9) below:

$$\{k\_sess\_hmac | k\_sess\_aes\} = key\_derive(key\_data) \quad (9)$$

where, in the Diffie-Hellman embodiment, key_data is the shared secret computed by the key exchange modules 214 and 234 and {k_sess_hmac| k_sess_aes} is the session key, which is a concatenation of the HMAC session key and the AES session key. The key_derive function may be any technically feasibly key derivation or generation technique. In one non-limiting example, the key_derive function could be based on SHA-384, which generates 384 bits of key data. In this example, the AES session key could be the leftmost 128 bits of the SHA-384 generated key data, while the HMAC session key could be a 256 bit key that includes the rightmost 256 bits of the SHA-384 key data.

In various embodiments, the session keys may include other keys instead of or in addition to an HMAC key and an AES key.

The key exchange modules 214 and 234 may exchange, in the Diffie-Hellman embodiment, public values and may compute a "shared secret" value that is private to the corresponding client machine 202 and server machine 204.

The base authentication modules 218 and 238 provide authentication of the server machine 204 to the client machine 202 in two circumstances. The first circumstance is during the initial exchange of messages between the client machine 202 and the server machine 204 prior to the establishment of session keys and exchange of master tokens. The second circumstance is when the server machine 204 receives a bad message from the client machine 202, as indicated by, for example, failing to decrypt data received from the client machine 202 or failing to verify an authentication code received from the client machine 202. In other words, base authentication modules 218 and 238 provide authentication on initial message exchange and as failure recovery authentication when a message failure is detected.

In various embodiments, the base authentication modules 218 and 238 may employ any technically feasible authentication technique or algorithm, including, without limitation, Rivest-Shamir-Adleman (RSA) public/private keys, elliptic-curve cryptography, digital signature algorithm (DSA), or Diffie-Hellman. By way of example only, the base authentication modules 218 and 238 described herein employ RSA public/private keys.

When the server machine 204 detects a failure or when exchanging initial messages with the client machine 202, the base authentication module 238 on the server machine 204 generates a signature to transmit to the client machine 202 according to equation (10) below:

$$sig = sign(data, RSA\_privatekey, hash\_algorithm) \quad (10)$$

where data is the data for transmission to the client machine 202, RSA_privatekey is the private RSA key held by the server machine 204, hash_algorithm identifies a particular hash technique, as described herein, and sig is the signature for transmission to the client machine 202 along with the data.

When the client machine 202 receives the message from the server machine 204, the base authentication module 218 on the client machine 202 verifies the message according equation (11) below:

$$\{T|F\} = verify(sig, data, RSA\_publickey, hash\_algorithm) \quad (11)$$

where sig is the received signature generated by the server, data is the corresponding received data, RSA_publickey is the public RSA key which has been pre-provisioned or previously received from the server machine 204, hash_algorithm identifies a particular hash technique, and {T|F} is a Boolean value that is true if the base authentication modules 218 successfully verifies the signature against the data, and false otherwise.

The user authentication module 220 optionally provides user authentication from the client machine 202. When a user of the client machine 202 enters, for example, a username and password, the user authentication module 220 or the user service system 250 determines whether the user has entered valid login credentials. The user authentication module 220 may make this determination by querying locally stored password data or may query a user service system 250. The user authentication module 220 may transmit the username and password to the server machine 204. Optionally, the user authentication module 220 may encrypt or hash the password prior to querying local password data or transmitting the username and password to the user service system 250 or the server machine 204.

The master token generator 240 on the server machine 204 generates master tokens to enable the client machine 202 and the server machine 204 to exchange messages securely. The master token generator 240 generates a pre-master token according to equation (12) below:

$$pre\_MT = issue(ID, k\_sess, renew\_time, exp\_time, seq\_num, MT\_ser\_num) \quad (12)$$

where the ID is a unique identifier, k_sess is the set of session keys generated by the key derivation module 236 (previously described as the HMAC key and AES key), renew_time indicates a time at which the server may choose to renew the master token when a message from the client is received with the renewable flag set, exp_time is the time when the current master token expires, seq_num is an anti-theft sequence number that is incremented when the master token is renewed, MT_ser_num is the master token serial number for token binding purposes, and pre_MT is the generated pre-master token. The ID is one or both of a client ID and an issuer ID, where the client ID identifies the client machine 202 and the issuer ID identifies the server machine 204 that issued the master token. In one embodiment, the ID is the concatenation of the client ID and the issuer ID.

The master token generator 240 then generates the final master token according to equation n(13) below:

$$MT = \text{encrypt}(\text{pre\_MT}, \text{MT\_key}) \quad (13)$$

where pre_MT is the pre-master token, MT_key is a master token encryption key, such as an AES key known only to the server machine 204 and other servers that share the MT_key in order to create a network of trust, and MT is the encrypted master token.

The user ID token generator 242 verifies user authentication and issues user ID tokens. The user ID token generator 242 may verify user authentication by querying a user service system 250 using equation (14) below:

$$\{T|F\} = \text{user\_auth}(\text{user\_auth\_data}) \quad (14)$$

where user_auth_data is any technically feasible user authentication data supported by the user service system 250, such as username and password, and {T|F} is a Boolean value returned by the user service system 250 that is true if the user authentication data is valid, and false otherwise.

If the user is authenticated, then the user ID token generator 242 generates a pre-user ID token according to equation (15) below:

$$\text{pre\_UIDT} = \text{issue}(\text{MT\_ser\_num}, \text{UIDT\_renew\_time}, \text{UIDT\_exp\_time}, \text{UIDT\_ser\_num}, \text{user\_data}) \quad (15)$$

where MT_ser_num is the master token serial number, UIDT_renew_time indicates a time when a user ID renewable message is to be transmitted by the server machine 204, exp_time is the time when the current user ID token session expires, UIDT_ser_num is the user ID token serial number for binding purposes, user_data is user data to be encrypted, and pre_UIDT is the generated pre-user ID token. Because user authentication typically involves querying an external user server system 250, the UIDT_renew_time and UIDT_exp_time are typically longer than the corresponding master token renew_time and exp_time. The MT_ser_num is used in the generation of the user ID token to ensure that the user ID token is bound to the master token.

The user ID token generator 242 then generates the final user ID token according to equation (16) below:

$$\text{UIDT} = \text{encrypt}(\text{pre\_UIDT}, \text{UIDT\_key}) \quad (16)$$

where pre_UIDT is the pre-user ID token, UIDT_key is a user token encryption key, such as an AES key known only to the server machine 204 and other servers that share the UIDT_key in order to create a network of trust, and UIDT is the encrypted user ID token.

The service token generator 244 generates and encrypts service tokens used by various services to persist state information in client stored tokens such that the server does not need to persist such state. In various embodiments, service tokens may be bound to both master tokens and user ID tokens, to master tokens only, or to no other tokens. The service token generator 244 generates pre-service tokens according to equation (17) below:

$$\text{pre\_ST} = (\text{name}, \text{data}, [\text{MT\_ser\_num}], [\text{UIDT\_ser\_num}]) \quad (17)$$

where name is the name of the service token and data is any arbitrary data from the corresponding service. In other words, name and data form a key-value pair, essentially operating as an HTTP cookie. Optional parameters include MT_ser_num (if the service token is bound to a master token), and UIDT_ser_num (if the service token is bound to a user UD token). pre_ST is the pre-service token.

The service token generator 244 then generates the final service token according to equation (18) below:

$$ST = \text{encrypt}(\text{pre\_ST}, \text{ST\_key}) \quad (18)$$

where pre_ST is the pre-service token, ST_key is a service token encryption key, such as an AES key, and ST is the encrypted service token. In some embodiments, the service token may not be encrypted, in which case, the service token is given by equation (19) below:

$$ST = \text{pre\_ST} \quad (19)$$

The application program 226 residing on the client machine 202 and the application program 246 residing on the server machine 204 communicate securely with each other via the various modules and generators described herein in conjunction with FIG. 2. In one example, and without limitation, application programs 226 and 246 could be configured to securely stream media content between the client machine 202 and the server machine 204.

In at least one embodiment, application program 226 residing on the client machine 202 may transmit a request to establish a secure communication channel with application program 246 residing on the server machine 204. The application program 226 may transmit such a request to one or more of the modules and generators residing on the client machine 202 as described herein. In response to this request, the modules and generators residing on the client machine 202 may exchange one or more messages with the modules and generators residing on the server machine 204, thereby establishing a secure communication channel between the application program 226 residing on the client machine 202 and the application program 246 residing on the server machine 204.

In at least one embodiment, application programs 226 and 246 may receive a request for entity authentication data from the base authentication modules 218 and 238, respectively. In response, the application programs 226 and 246 may transmit the entity authentication data to the base authentication modules 218 and 238, respectively. In at least one embodiment, application program 226 may receive a request for user authentication data from the user authentication module 220. In response, the application program 226 may transmit the entity authentication data to the user authentication module 220.

Although the modules and token generators are described in a particular order, the operations performed by these modules and token generators may be performed in any technically feasible order. For example, the functions performed by the user authentication module 220 could be performed either before or after the operations performed by the base authentication modules 218 and 238. In particular, if a initialization scheme which does not support encryption is used with a user authentication scheme that requires encryption, then a key exchange may need to happen prior to initiation of user authentication in order to ensure secure data transfer. Such an approach may result in additional round-trip message exchange.

In another example, the master token generator 240, user ID token generator 242, and service token generator 244 may be implemented as separate token generators, as a single token generator that generates all three token types, or in any technically feasible combination.

Figure 3A:
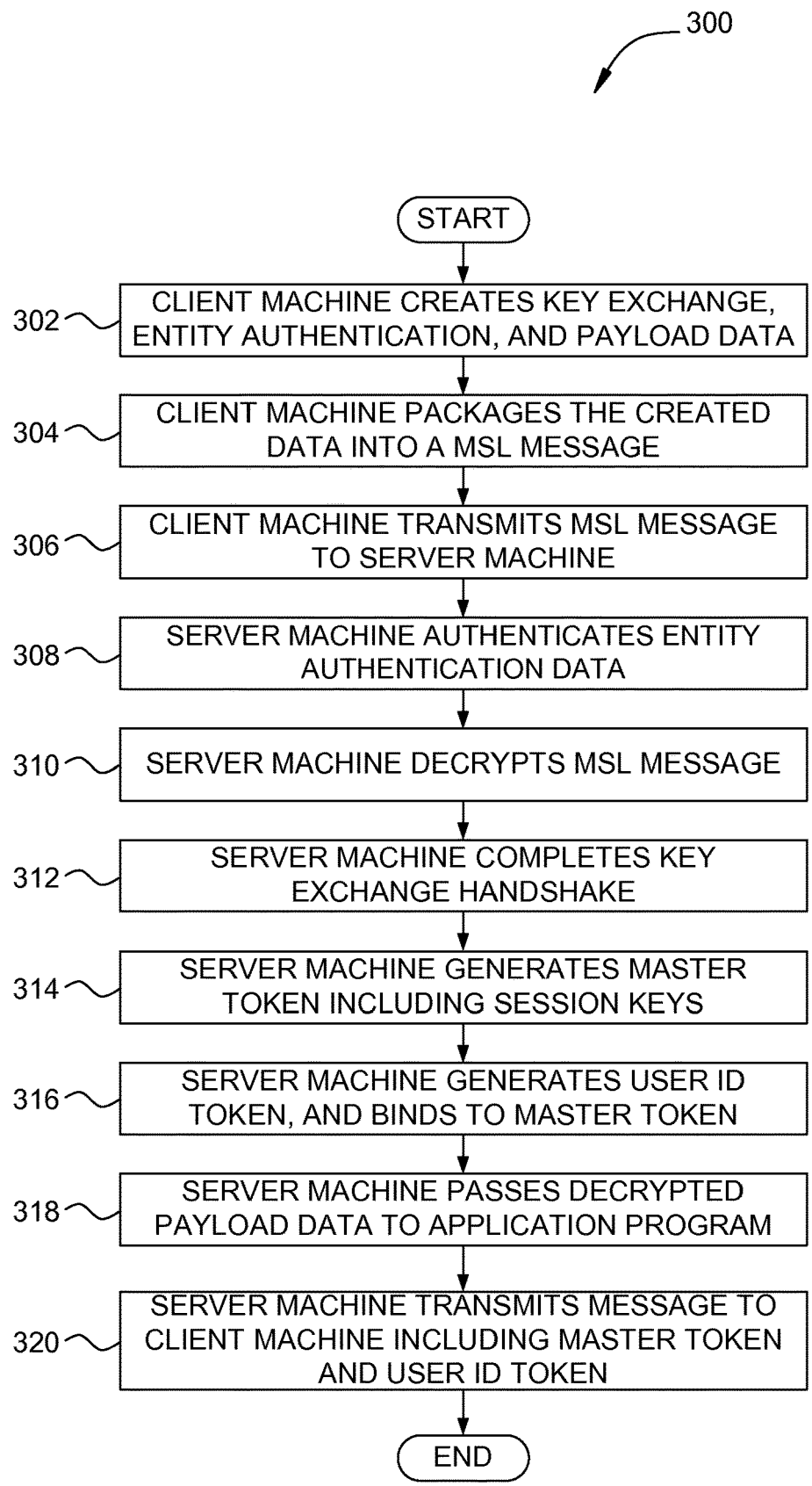
FIG. 3A sets forth a flow diagram of method steps for exchanging secure messages between a client machine and a server machine, according to various embodiments of the present invention.

FIG. 3A sets forth a flow diagram of method steps for exchanging secure messages between a client machine and a server machine, according to various embodiments of the present invention. Although the method steps are described in conjunction with the systems of FIGS. 1-2, persons of ordinary skill in the art will understand that any system configured to perform the method steps, in any order, is within the scope of the present invention.

As shown, a method 300 begins at step 302, where a client machine 202 creates key exchange data, entity authentication data, and payload data. In some embodiments, the client machine 202 also creates user authentication data. At step 304, the client machine 202 packages the key exchange data, entity authentication data, payload data, and, if applicable, user authentication data, into a MSL message based on keys that are pre-shared, or pre-provisioned, between the client machine 202 and a server machine 204. Packaging the data into the MSL message involves: (a) encryption of the MSL message using a pre-provisioned client encryption key; and (b) authentication of the encrypted MSL message using a pre-provisioned authentication key. The authentication may be accomplished via any technically feasible approach, including, without limitation, HMAC, RSA signature, and ECC signature. At step 306, the client machine 202 transmits the encrypted and authenticated MSL message to the server machine 204.

At step 308, the server machine 204 authenticates the entity authentication data. In some embodiments, the server machine 204 also authenticates the user authentication data. At step 310, the server machine 204 decrypts the MSL message using the pre-shared encryption key. At step 312, the server machine 204 completes the key exchange handshake, producing key exchange data to return to the client, and generates the session keys. At step 314, the server machine 204 generates the master token, where the master token includes the session keys. In various embodiments, the master token may also include, without limitation, an identifier (ID) associate with one or both of a client machine 202 ID and a master token issuer ID, a master token renewal time, a master token expiration time, a sequence number, and a master token serial number. At step 316, the server machine 204 generates a user ID Token and binds the user ID token to the master token using the master token serial number. In various embodiments, the user ID token may include a master token serial number, a user ID expiration time, a user ID renewal time, a user ID serial number, and user data. At step 318, the server machine 204 passes the decrypted payload data to an application program for processing. At step 320, the server machine 204 transmits a message to the client machine that includes key exchange data that, in turn, includes the master token. The message further includes the user ID token. The method 300 then terminates.

In some embodiments, the server machine 204 and the client machine 202 may not have exchanged pre-shared keys. In such embodiments, the client machine 202 may create key exchange data, but may not create user authentication data or payload data at this initial step. The client machine 202 may package the key exchange data into a MSL message for the sole purpose of key exchange. The client machine 202 may send the MSL message to the server machine 204.

The server machine 204 may complete the key exchange handshake by producing key exchange data to return to the client and may generate the session keys. The server machine 204 may generate the master token, where the master token includes the session keys. The server machine 204 may return the master token to the client machine 202.

The client machine 202 may then create user authentication data and payload data. The client machine 202 may package the payload data along with the master token and may create a MSL message. The creation of the MSL message may involve: (a) encryption of the MSL message using an encryption key created during key exchange; and (b) authentication of the encrypted MSL message using a MAC key created during key exchange. The client machine 202 may transmit the encrypted and authenticated MSL message to the server machine 204.

The server machine 204 may decrypt the master token to retrieve the session keys needed to authenticate and decrypt the MSL message from the client. The server machine 204 may authenticate the MSL message using the MAC key retrieved and decrypted by the server machine 204. The server machine 204 may decrypt the MSL message using the encryption key retrieved and decrypted by the server machine 204. In addition, the server machine 204 may authenticate the user authentication data, if provided. Typically, the server machine 204 authenticates the user authentication data after decrypting the master token and validating the MSL message. The server machine 204 may generate a user ID token and bind the user ID token to the master token using the master token serial number. The server machine 204 may pass the decrypted payload data to the application program for processing.

In some embodiments, one or more steps in the above-described flows may fail due to a corrupted message. In such embodiments, the client machine 202 and the server machine 204 may enter a failure recovery mode using pre-provisioned keys. The failure recovery mode may utilize any technically feasible approach for communicating via pre-provisioned keys, including, without limitation, RSA, ECC, or a technique that employs mutually shared symmetric keys, such as AES. In the case of RSA, the client machine 202 may have a pre-provisioned RSA public key while the server machine 204 may have the corresponding pre-previsioned RSA private key. Alternatively, the server machine 204 may have a pre-provisioned RSA public key while the client machine 202 may have the corresponding pre-previsioned RSA private key. Using the pre-provisioned keys, the client machine 202 and the server machine 204 may exchange messages, including key exchange information, in order to reestablish fully secure communications with a new master token and associated session keys. The client machine 202 and the server machine 204 may also use the pre-provisioned keys to return an error message, exchange logging information, or communicate via any arbitrary message. Although the client machine 202 and the server machine 204 typically recover and reestablish communications via a new master token and associated session keys, the client machine 202 and the server machine 204 may, in the alternative, continue to communicate via the pre-provisioned keys without exchanging a new master token.

If the pre-provisioned key mechanism does not does not support encryption, then the client machine 202 and the server machine 204 may not exchange payload intended to remain secure and private between the client machine 202 and the server machine 204. In such cases, the client machine 202 and the server machine 204 may choose to not exchange payload data until a new master token is exchanged with corresponding new session keys are exchanged between the client machine 202 and the server machine 204, and fully secure communications are reestablished. If the mechanism to resume secure communication involves a trust-on-first-use (TOFU) approach, then the machines may re-establish secure communications via a quasi-secure approach until new master tokens with corresponding new sets of session keys are exchanged between the machines.

In some embodiments, the approach for re-establishing secure communications includes exchanging messages that are not encrypted. In such embodiments, the server machine 204 may transmit, to the client machine 202, one or more plaintext messages, that is, unencrypted MSL messages that include logging and error information and other information that does not need to be exchanged via a secure communication channel. Likewise, the client machine 202 may transmit, to the server machine 204, one or more plaintext messages, that is, unencrypted MSL messages that include logging and error information and other information that does not need to be exchanged via a secure communication channel. The server machine 204 may cause a client in a corrupt state to initiate the flow described above in conjunction with FIG. 3 for cases where the client machine 202 and the server machine 204 have "pre-shared" keys.

Failure Recovery Mechanism to Re-Establish Secured Communications

The failure recovery mechanism is engaged in response to an error message, such as an error message transmitted by the client machine 202 to the server machine 204. Such error messages typically indicate that the client machine 202 encountered a failure in parsing, authentication, execution, or security. Parsing failures indicate that the client machine 202 received a malformed messages or garbage tokens. Authentication failures indicate that the client machine 202 received a message with incorrect entity or user credentials. Execution failures indicate network or backend service problems. Security failures indicate incorrect message characteristics for a particular message security protocol. Various failure recovery processes to recover from authentication failures are now described. Via these processes, a secure communication channel is established between the client machine 202 and the server machine 204 via pre-provisioned keys. Via this secure communication channel using pre-provisioned keys, the client machine 202 and the server machine 204 exchange a new master token, user ID token, and service tokens, along with new session keys, thereby fully reestablishing secure communications without manual intervention.

Figure 3B:
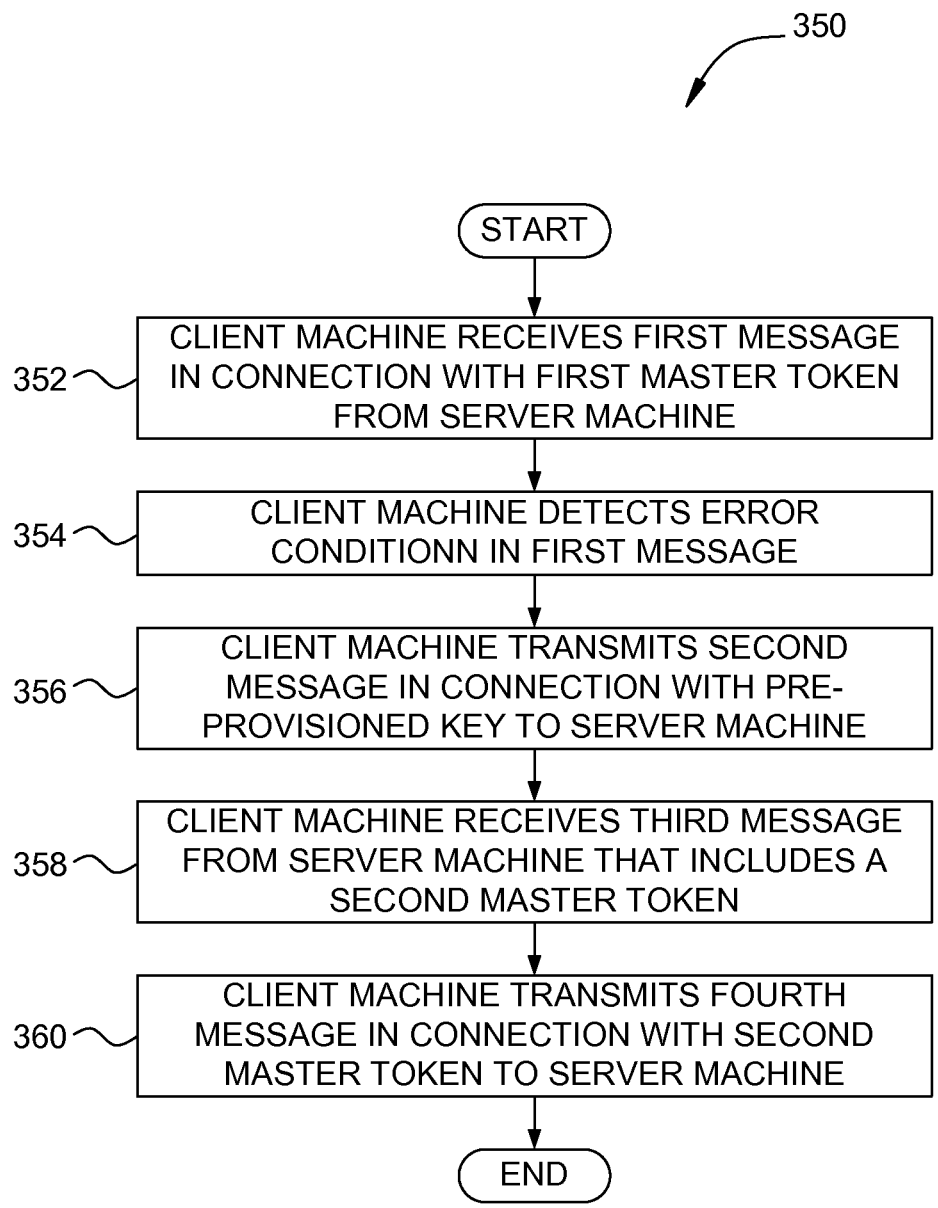
FIG. 3B sets forth a flow diagram of method steps for reestablishing a secure communication channel between a client machine and a server machine, according to various embodiments of the present invention.

FIG. 3B sets forth a flow diagram of method steps for reestablishing a secure communication channel between a client machine 202 and a server machine 204, according to various embodiments of the present invention. Although the method steps are described in conjunction with the systems of FIGS. 1-2, persons of ordinary skill in the art will understand that any system configured to perform the method steps, in any order, is within the scope of the present invention.

As shown, a method 350 begins at step 352, where a client machine 202 receives, from a server machine 204, a first message generated in connection with a first master token.

At step 354, the client machine 202 detects an error condition associated with the first message. In some embodiments, the error condition may indicate that the first message has been corrupted or compromised. At step 356, the client machine 202 transmits, to the server machine 204, a second message generated in connection with a pre-provisioned key that includes a request for a new master token. In some embodiments, the client machine 202 and the server machine 204 may enter a failure recovery mode based on using the pre-provisioned key. The pre-provisioned key may be based on any technically feasible approach, including, without limitation, RSA, ECC, or a technique that employs mutually shared symmetric keys, such as AES. In the case of RSA, the client machine 202 may have a pre-provisioned RSA public key while the server machine 204 may have the corresponding pre-previsioned RSA private key. Alternatively, the server machine 204 may have a pre-provisioned RSA public key while the client machine 202 may have the corresponding pre-previsioned RSA private key.

At step 358, the client machine 202 receives, from the server machine 204, a third message that includes a second master token. At step 360, the client machine 202 transmits, to the server machine 204, a fourth message generated in connection with the second master token. The method 350 then terminates.

In some embodiments, the client machine 202 and the server machine 204 may also use the pre-provisioned keys to return an error message, exchange logging information, or communicate via any arbitrary message. Although the client machine 202 and the server machine 204 typically recover and reestablish communications via a new master token and associated session keys, the client machine 202 and the server machine 204 may, in the alternative, continue to communicate via the pre-provisioned keys without exchanging a new master token.

Figure 4:
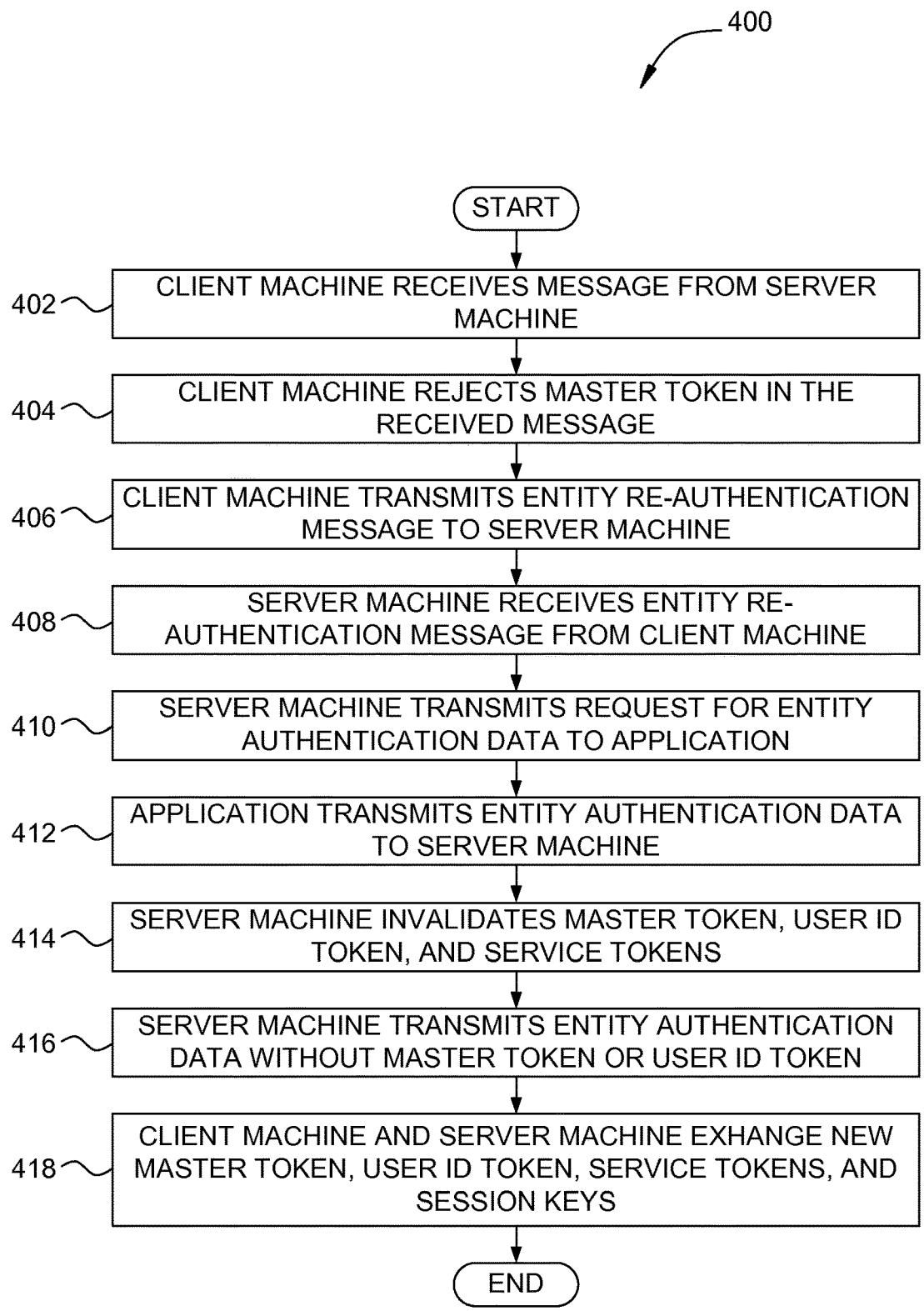
FIG. 4 sets forth a flow diagram of method steps for performing an entity re-authentication process, according to various embodiments of the present invention.

FIG. 4 sets forth a flow diagram of method steps for performing an entity re-authentication process, according to various embodiments of the present invention. Although the method steps are described in conjunction with the systems of FIGS. 1-2, persons of ordinary skill in the art will understand that any system configured to perform the method steps, in any order, is within the scope of the present invention.

As shown, a method 400 begins at step 402, where the client machine 202 receives a message from the server machine 204. At step 404, the client machine 202 rejects the master token in the received message. The client machine 202 typically rejects the master token if the received master token is different from the current master token recognized by the client machine 202.

At step 406, the client machine 202 transmits an entity re-authenticate error message to the server machine 204. At step 408, the server machine 204 receives the entity re-authenticate error message from the client machine 202. At step 410, the server machine 204 initiates entity re-authentication by transmitting a request for entity authentication data to an application program that initiated the message. The application program may be executing on the server machine 204 or on any technically feasible computing device or machine. In some embodiments, the server machine 204 may include information from the received error message in the request.

At step 412, the application program transmits the entity authentication data to the server machine 204. At step 414, the server machine 206 invalidates the previous master token, user ID tokens, and bound service tokens. At step 416, the server machine 204 transmits a message to the client machine 202 that includes the entity authentication data without any master token or user ID token.

At step 418, the client machine 202 and the server machine 204 exchange a new master token, user ID token, service tokens, and session keys, thereby reestablishing fully secure communications. The method 400 then terminates.

Figure 5:
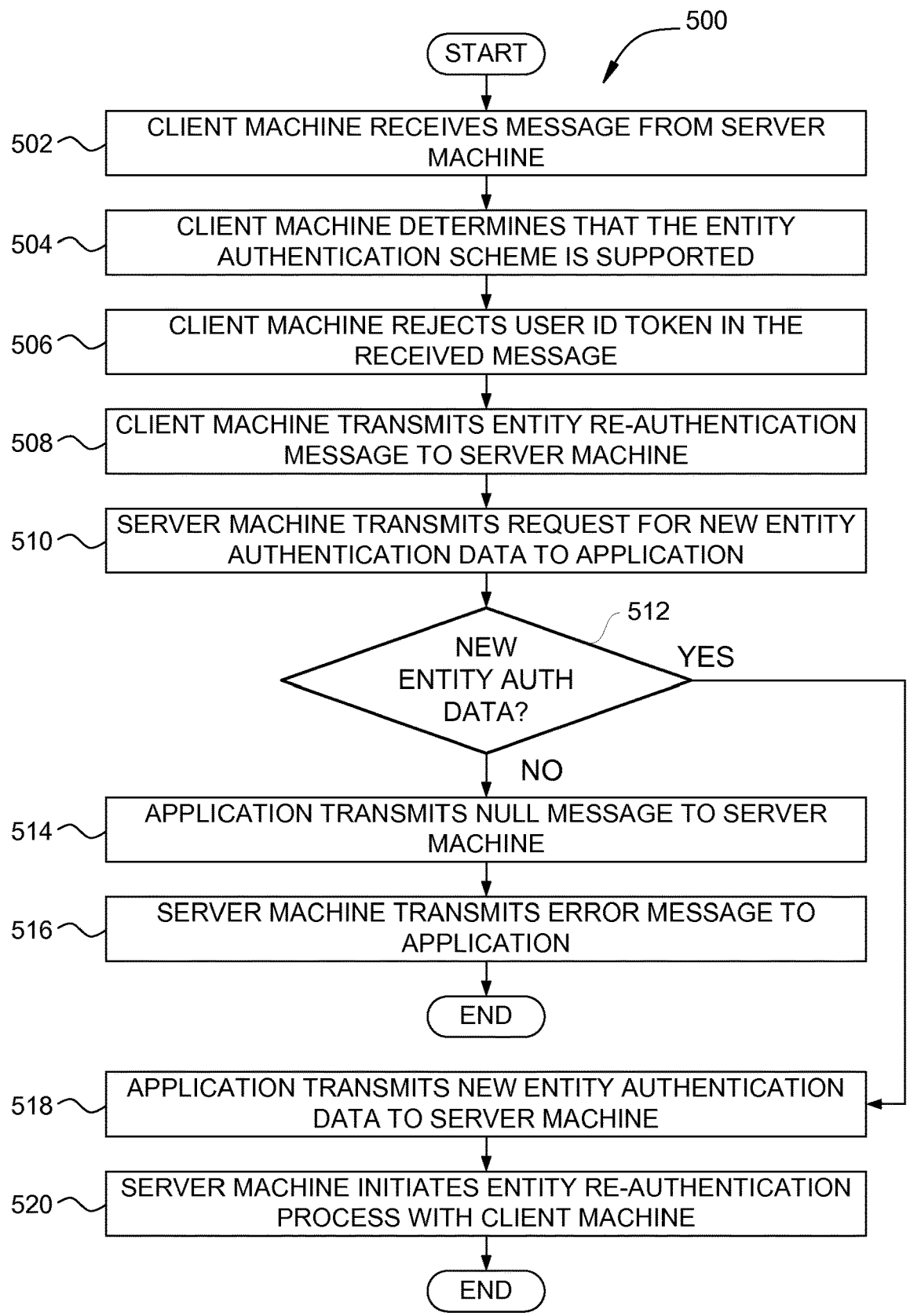
FIG. 5 sets forth a flow diagram of method steps for performing an entity data re-authentication process, according to various embodiments of the present invention.

FIG. 5 sets forth a flow diagram of method steps for performing an entity data re-authentication process, according to various embodiments of the present invention. Although the method steps are described in conjunction with the systems of FIGS. 1-2, persons of ordinary skill in the art will understand that any system configured to perform the method steps, in any order, is within the scope of the present invention.

As shown, a method 500 begins at step 502, where the client machine 202 receives a message from the server machine 204. At step 504, the client machine 202 determines that the client machine 202 supports the entity authentication scheme specified by the received message. At step 506, the client machine 202 nevertheless rejects the entity authentication data in the received message for a correctable reason. At step 508, the client machine 202 transmits an entity data re-authenticate error message to the server machine 204.

At step 510, the server machine 204 initiates entity data re-authentication by transmitting a request for new entity authentication data to an application program that initiated the message. The application program may be executing on the server machine 204 or on any technically feasible computing device or machine. In some embodiments, the server machine 204 may include information from the received error message in the request. At step 512, the application program determines whether new entity authentication data exists. If no new entity data exists, then the method 500 proceeds to step 514, where the application program transmits a null message to the server machine 204. At step 516, the server machine 204 transmits an error message to the application program. The method 500 then terminates.

Returning to step 512, if new entity data exists, then the method 500 proceeds to step 518, where the application program transmits a message to the server machine 204 that includes the new entity authentication data. At step 520, the server machine 204 initiates an entity re-authentication process with the client machine 202, such as the method described in conjunction with FIG. 4. The method 500 then terminates.

Figure 6A:
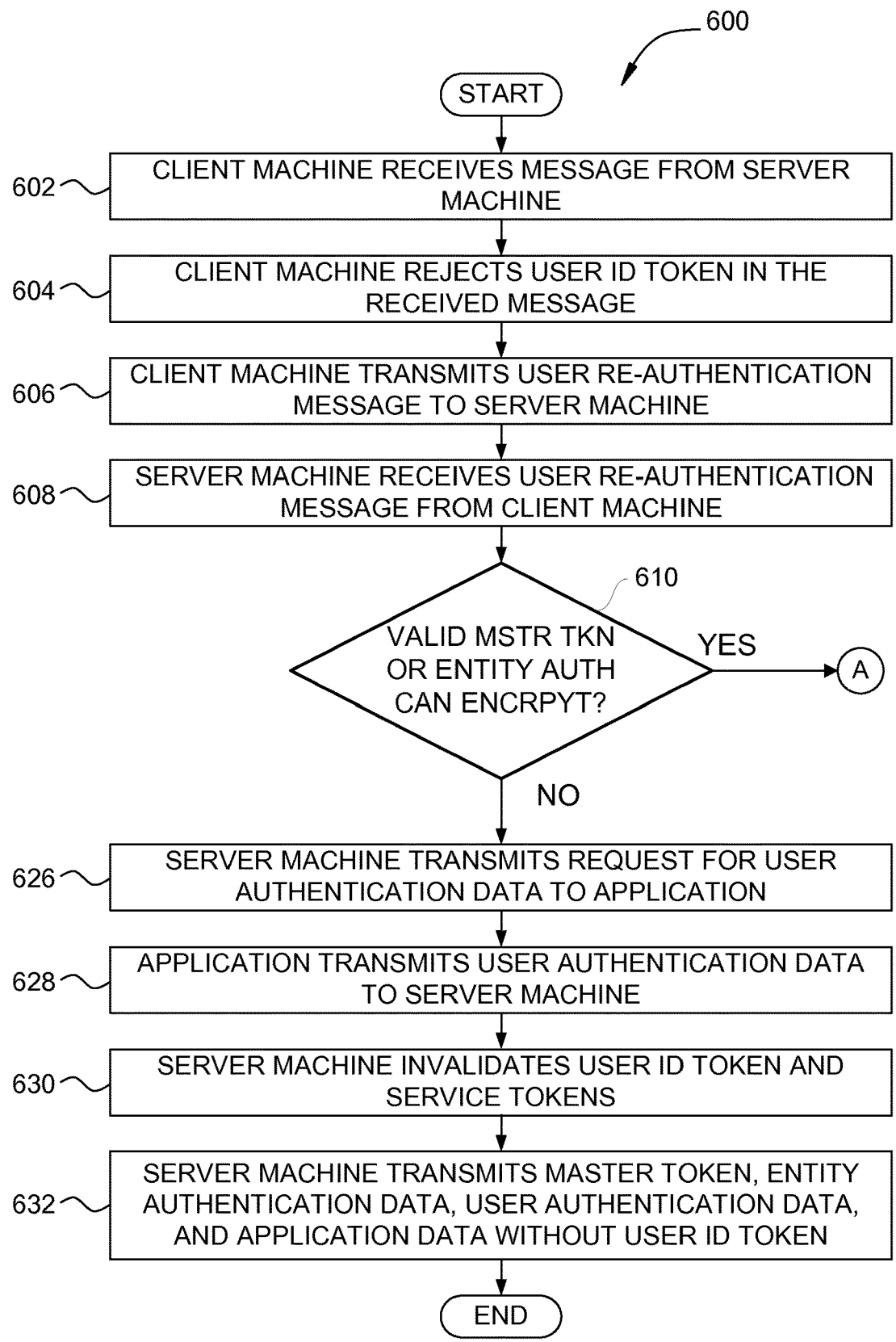
FIGS. 6A-6B set forth a flow diagram of method steps for performing a user re-authentication process, according to various embodiments of the present invention.
Figure 6B:
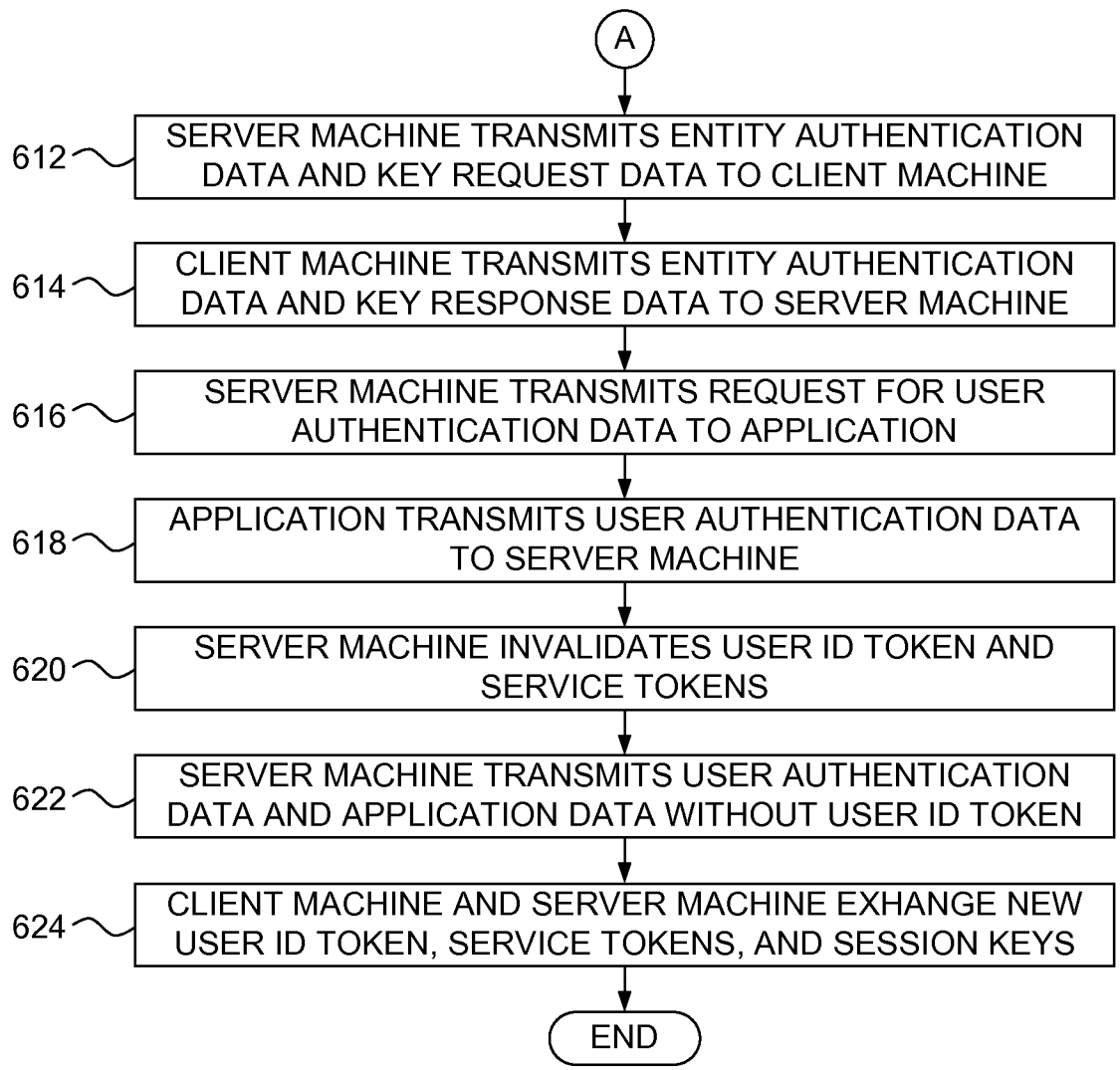

FIGS. 6A-6B set forth a flow diagram of method steps for performing a user re-authentication process, according to various embodiments of the present invention. Although the method steps are described in conjunction with the systems of FIGS. 1-2, persons of ordinary skill in the art will understand that any system configured to perform the method steps, in any order, is within the scope of the present invention.

As shown, a method 600 begins at step 602, where the client machine 202 receives a message from the server machine 204. At step 604, the client machine 202 rejects the user ID token in the received message. In some embodiments, the client machine 202 rejects the user ID token because the user ID token identifies a different user than the user specified by the user authentication data in the received message. At step 606, the client machine 202 transmits a user re-authenticate error message to the server machine 204. At step 608, the server machine 204 receives the entity re-authenticate error message from the client machine 202.

At step 610, the server machine 204 initiates user re-authentication by determining whether there is no currently valid master token and that the current entity authentication data cannot be encrypted. If there is no currently valid master token and the current entity authentication data cannot be encrypted, then the method 600 proceeds to step 612, where the server machine 204 transmits a message to the client machine 202, where the message includes entity authentication data and key request data. At step 614, client machine 202 transmits a message to the server machine 204, where the message includes entity authentication data and key response data. At step 616, the server machine 204 transmits a request for user authentication data to an application program that initiated the message. The application program may be executing on the server machine 204 or on any technically feasible computing device or machine. In some embodiments, the server machine 204 may include information from the received error message in the request. At step 618, the application program transmits the user authentication data to the server machine 204.

At step 620, the server machine 206 invalidates the previous user ID tokens and bound service tokens. At step 622, the server machine 204 transmits a message to the client machine 202 that includes the master token, the user authentication data, and application data without any user ID token. At step 624, the client machine 202 and the server machine 204 exchange a new user ID token, service tokens, and session keys, thereby reestablishing fully secure communications. The method 600 then terminates.

Returning to step 610, if there is a currently valid master token or the current entity authentication data can be encrypted, then the method 600 proceeds to step 626, where the server machine 204 transmits a request for user authentication data to the application program that initiated the message. In some embodiments, the server machine 204 may include information from the received error message in the request. At step 628, the application program transmits the user authentication data to the server machine 204. At step 630, the server machine 206 invalidates the previous user ID tokens and bound service tokens. At step 632, the server machine 204 transmits a message to the client machine 202 that includes the master token, the entity authentication data, the user authentication data, and application data without any user ID token. The method 600 then terminates.

Figure 7:
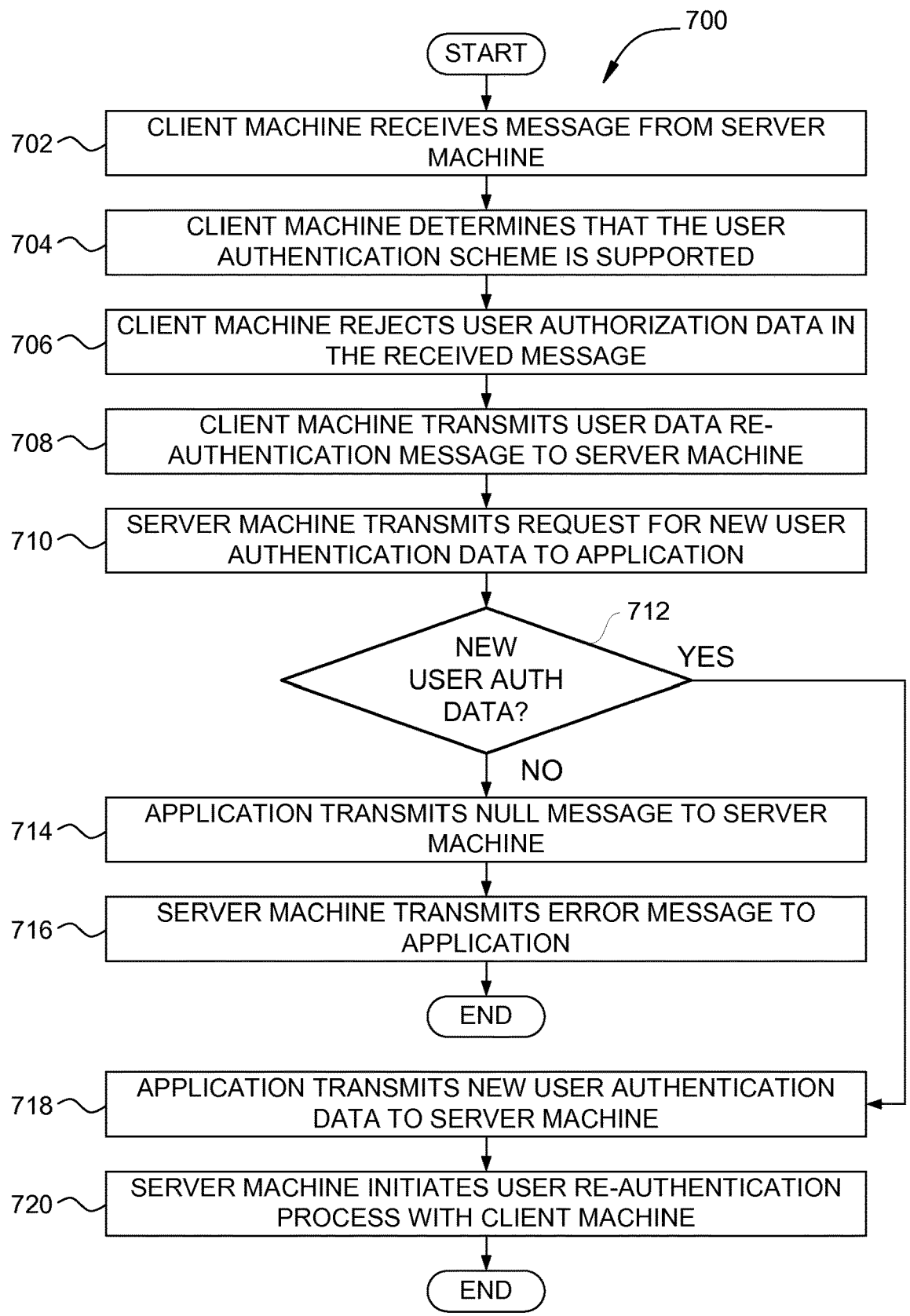
FIG. 7 sets forth a flow diagram of method steps for performing a user data re-authentication process, according to various embodiments of the present invention.

FIG. 7 sets forth a flow diagram of method steps for performing a user data re-authentication process, according to various embodiments of the present invention. Although the method steps are described in conjunction with the systems of FIGS. 1-2, persons of ordinary skill in the art will understand that any system configured to perform the method steps, in any order, is within the scope of the present invention.

As shown, a method 700 begins at step 702, where the client machine 202 receives a message from the server machine 204. At step 704, the client machine 202 determines that the client machine 202 supports the user authentication scheme specified by the received message. At step 706, the client machine 202 nevertheless rejects the user authentication data in the received message for a correctable reason. At step 708, the client machine 202 transmits a user data re-authenticate error message to the server machine 204.

At step 710, the server machine 204 initiates user data re-authentication by transmitting a request for new user authentication data to an application program that initiated the message. The application program may be executing on the server machine 204 or on any technically feasible computing device or machine. In some embodiments, the server machine 204 may include information from the received error message in the request.

At step 712, the application program determines whether new user authentication data exists. If no new user data exists, then the method 700 proceeds to step 714, where the application program transmits a null message to the server machine 204. At step 716, the server machine 204 transmits an error message to the application program. The method 700 then terminates.

Returning to step 712, if new user data exists, then the method 500 proceeds to step 718, where the application program transmits a message to the server machine 204 that includes the new user authentication data. At step 720, the server machine 204 initiates a user re-authentication process with the client machine 202, such as the method described in conjunction with FIGS. 6A-6B. The method 700 then terminates.

In sum, a receiving machine that fails to authenticate an incoming secure message transmits an error condition to the originating machine that transmitted the message. The originating machine initiates a failure recovery mechanism using pre-provisioned keys in order to reestablish fully secure communications. The originating machine transmits a request for updated authentication data from an application program that provides such authentication data. After receiving the updated authentication data from the application program, the originating machine invalidates the current master token, user ID token, and bound service tokens. The originating machine transmits the updated authentication data to the receiving machine. Through this process, a secure communication channel is established between the two machines using pre-provisioned keys. Via this secure communication channel, the two machines exchange a new master token, user ID token, and service tokens, along with new session keys, thereby reestablishing fully secure communications without manual intervention.

At least one advantage of the disclosed approach is that, after a security error condition is encountered during a message exchange between machines, those machines can automatically reestablish secure communications via a secure failure recovery technique using pre-provisioned keys. As a result, secure communications between the machines can be restored without manual intervention, in contrast with prior art approaches. The level of human involvement in recovering from a failure is thereby reduced, resulting in improved security and a reduction of downtime prior to restoration fully secure communications.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the subject matter described herein are set out in the following numbered clauses.

1. A computer-implemented method, comprising receiving, from a server machine, a first message generated in connection with a first master token; detecting an error condition associated with the first message; transmitting, to the server machine, a second message generated in connection with a pre-provisioned key that includes a request for a new master token; receiving, from the server machine, a third message that includes a second master token; and transmitting, to the server machine, a fourth message generated in connection with the second master token.

2. The method of clause 2, further comprising requesting entity authentication data from an application program that resides on the client machine; and receiving the entity authentication data from the application program; wherein the second message includes the entity authentication data.

3. The method of either clause 1 or clause 2, further comprising requesting user authentication data from an application program that resides on the client machine; and receiving the user authentication data from the application program; wherein the second message includes the user authentication data.

4. The method of any of clauses 1-3, wherein the first set of session keys is encoded according to an encoding scheme that is undetectable by the client machine.

5. The method of any of clauses 1-4, wherein the first master token includes a first set of session keys.

6. The method of clauses 1-5, wherein the second master token includes a second set of session keys.

7. The method of any of clauses 1-6, wherein the second message includes logging and error information.

8. The method of any of clauses 1-7, further comprising encrypting the second message based on a pre-shared public key that has been previously deployed to the client machine.

9. A program product comprising a non-transitory computer-readable storage medium including instructions that, when executed by a processor, cause the processor unit to perform the steps of establishing a secure communication channel with a server machine via a first set of session keys; detecting an error condition associated with a first message received from the server machine; transmitting, to the server machine, a second message, based on a pre-provisioned key that is not included in the first set of session keys, that includes first key exchange data; and reestablishing a secure communication channel with the server machine via the key exchange data.

10. The program product of clause 9, wherein the first set of session keys is encoded according to an encoding scheme that is undetectable by the client machine.

11. The program product of either clause 9 or clause 10, wherein reestablishing a secure communication channel with the server machine comprises receiving, from the client machine, a third message that includes second key exchange data.

12. The program product of any of clause 9-11, wherein reestablishing a secure communication channel with the server machine comprises receiving, from the client machine, a third message that includes a second master token that includes the second set of session keys.

13. The program product of any of clauses 9-12, wherein the second message is an unencrypted message that includes logging and error information.

14. The program product of any of clauses 9-13, wherein the second message is encrypted based on a pre-shared public key that has been previously deployed to the client machine.

15. The program product of any of clauses 9-14, wherein the pre-shared public key is based on Rivest-Shamir-Adleman (RSA) public-private keys.

16. A client machine, comprising a processor; and a memory coupled to the processor and including a base authentication module and a key exchange module; wherein, when executed by the processor, the base authentication module is configured to establish a secure communication channel with a server machine via a first set of session keys, and fail to authenticate a first message received from the server machine; and wherein, when executed by the processor, the key exchange module is configured to transmit, to the server machine, a second message, based on a pre-provisioned key that is not included in the first set of session keys, that includes first key exchange data, and reestablish a secure communication channel with the client machine via the first key exchange data.

17. The server machine of clause 16, wherein the first set of session keys is encoded according to an encoding scheme that is undetectable by the client machine.

18. The server machine of either clause 16 or clause 17, wherein the second message is an unencrypted message that includes logging and error information.

19. The server machine of any of clauses 16-18, wherein the second message is encrypted based on a pre-shared public key that has been previously deployed to the client machine.

20. The server machine of any of clauses 16-19, wherein the second message is an encrypted message that includes payload data.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   receiving, from a server machine, a first message generated in connection with a first master token and a first set of session keys;
   detecting an error condition associated with the first message;
   transmitting, to the server machine, a second message comprising a plurality of parameters including entity authentication data, user authentication data, an error message indicating that the first message has incorrect message characteristics based on a message security layer protocol associated with the first set of session keys, and a request for a new master token, wherein the second message is encrypted using a pre-provisioned AES encryption key, and wherein the encrypted second message is authenticated using a pre-provisioned HMAC authentication key generated prior to a session associated with the first set of session keys;
   receiving, from the server machine, a third message that includes a second master token; and
   transmitting, to the server machine, a fourth message generated in connection with the second master token.

2. The method of claim 1, further comprising:
   requesting the entity authentication data from an application program that resides on a client machine; and
   receiving the entity authentication data from the application program.

3. The method of claim 1, further comprising:
   requesting the user authentication data from an application program that resides on a client machine; and
   receiving the user authentication data from the application program.

4. The method of claim 1, wherein the first set of session keys is encoded according to an encoding scheme.

5. The method of claim 1, wherein the first master token includes the first set of session keys.

6. The method of claim 1, wherein the second master token includes a second set of session keys.

7. The method of claim 1, wherein the second message includes logging and error information.

8. A non-transitory computer-readable storage medium including instructions that, when executed by a processor, cause the processor to perform the steps of:
establishing a secure communication channel with a server machine via a first set of session keys;
detecting an error condition associated with a first message received from the server machine;
transmitting, to the server machine, a second message comprising a plurality of parameters including entity authentication data, user authentication data, an error message indicating that the first message has incorrect message characteristics based on a message security layer protocol associated with the first set of session keys, and a request for a new master token, wherein the second message is encrypted using a pre-provisioned AES encryption key, and wherein the encrypted second message is authenticated using a pre-provisioned HMAC authentication key generated prior to a session associated with the first set of session keys; and
reestablishing the secure communication channel with the server machine via first key exchange data.

9. The non-transitory computer-readable storage medium of claim 8, wherein the first set of session keys is encoded according to an encoding scheme.

10. The non-transitory computer-readable storage medium of claim 8, wherein reestablishing the secure communication channel with the server machine comprises receiving, from a client machine, a third message that includes second key exchange data.

11. The non-transitory computer-readable storage medium of claim 8, wherein reestablishing the secure communication channel with the server machine comprises receiving, from a client machine, a third message that includes a second master token that includes a second set of session keys.

12. The non-transitory computer-readable storage medium of claim 8, wherein the second message is an unencrypted message that includes logging and error information.

13. A client machine, comprising:
a processor; and
a memory coupled to the processor and including a base authentication module and a key exchange module;

wherein, when executed by the processor, the base authentication module is configured to:
establish a secure communication channel with a server machine via a first set of session keys, and
fail to authenticate a first message received from the server machine; and
wherein, when executed by the processor, the key exchange module is configured to:
transmit, to the server machine, a second message comprising a plurality of parameters including entity authentication data, user authentication data, an error message indicating that the first message has incorrect message characteristics based on a message security layer protocol associated with the first set of session keys, and a request for a new master token, wherein the second message is encrypted using a pre-provisioned AES encryption key, and wherein the encrypted second message is authenticated using a pre-provisioned HMAC authentication key generated prior to the session associated with the first set of session keys, and
reestablish the secure communication channel with the client machine via first key exchange data.

14. The server machine of claim 13, wherein the first set of session keys is encoded according to an encoding scheme.

15. The server machine of claim 13, wherein the second message is an unencrypted message that includes logging and error information.

16. The server machine of claim 13, wherein the second message is an encrypted message that includes payload data.

17. The method of claim 1, wherein the second message is encrypted in at least one of a hardware security module or a trusted execution environment.

18. The method of claim 1, wherein the encrypted second message is generated based on an initialization vector and a mode, wherein the mode comprises at least one of an electronic code book mode, a cipher-block chaining mode, or a counter mode.

19. The method of claim 1, wherein the pe-provisioned HMAC authentication key is associated with a hash algorithm comprising at least one of SHA-1, SHA-256, or SHA-3.

* * * * *